United States Patent
Voit et al.

(10) Patent No.: US 12,541,404 B2
(45) Date of Patent: Feb. 3, 2026

(54) ADMISSION CONTROL BASED ON UNIVERSAL REFERENCES FOR HARDWARE AND/OR SOFTWARE CONFIGURATIONS

(71) Applicant: Cisco Technology, Inc., San Jose, CA (US)

(72) Inventors: Eric A. Voit, Bethesda, MD (US); Edward A. Warnicke, Austin, TX (US); Jeffrey G. Schutt, Davis, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 559 days.

(21) Appl. No.: 17/826,411

(22) Filed: May 27, 2022

(65) Prior Publication Data

US 2023/0385120 A1  Nov. 30, 2023

(51) Int. Cl.
| | |
|---|---|
| *G06F 9/50* | (2006.01) |
| *G06F 9/445* | (2018.01) |
| *G06F 9/54* | (2006.01) |
| *G06F 21/12* | (2013.01) |
| *G06F 21/53* | (2013.01) |

(52) U.S. Cl.
CPC .......... *G06F 9/505* (2013.01); *G06F 9/44505* (2013.01); *G06F 9/5044* (2013.01); *G06F 9/5055* (2013.01); *G06F 9/54* (2013.01); *G06F 21/121* (2013.01); *G06F 21/53* (2013.01)

(58) Field of Classification Search
CPC ........ G06F 9/54; G06F 9/505; G06F 9/44505; G06F 9/5044; G06F 9/5055; G06F 21/53
See application file for complete search history.

(56) References Cited

U.S. PATENT DOCUMENTS

| | | | |
|---|---|---|---|
| 6,363,486 B1 * | 3/2002 | Knapton, III | ......... G06F 21/121 705/57 |
| 6,694,434 B1 | 2/2004 | McGee et al. | |
| | | (Continued) | |

OTHER PUBLICATIONS

Wikipedia, "Merkle tree," https://en.wikipedia.org/w/index.php?title=Merkle_tree&oldid=1048067804, Oct. 4, 2021, 5 pages.

(Continued)

*Primary Examiner* — Lewis A Bullock, Jr.
*Assistant Examiner* — Carlos Alberto Espana
(74) *Attorney, Agent, or Firm* — Edell, Shapiro & Finnan, LLC

(57) ABSTRACT

A method, computer system, and computer program product are provided for performing admission control tasks. A universal reference for an executing application is obtained, wherein the universal reference identifies one or more components of the executing application by additional universal references assigned to the one or more components. A description of the executing application is determined by enumerating each additional universal reference of the one or more components and additional sub-components, wherein the description exhaustively identifies components and sub-components of the executing application. The identified one or more components and sub-components are assessed to perform an admission control operation between the executing application and a second application.

20 Claims, 10 Drawing Sheets

(56) References Cited

U.S. PATENT DOCUMENTS

| | | | |
|---|---|---|---|
| 7,062,650 B2* | 6/2006 | Robbins | G06F 21/51 |
| | | | 713/165 |
| 9,514,317 B2* | 12/2016 | Martin | H04L 63/08 |
| 10,360,168 B1 | 7/2019 | Griffin et al. | |
| 11,165,861 B2 | 11/2021 | Sheth et al. | |
| 12,075,107 B1 | 8/2024 | Dolan et al. | |
| 2003/0056200 A1 | 3/2003 | Li et al. | |
| 2013/0145445 A1 | 6/2013 | Kiethreiber | |
| 2014/0040924 A1 | 2/2014 | Jordahl et al. | |
| 2014/0173071 A1* | 6/2014 | Hazen | H04L 63/0876 |
| | | | 709/223 |
| 2016/0070609 A1 | 3/2016 | Chippa et al. | |
| 2016/0099847 A1 | 4/2016 | Melander et al. | |
| 2016/0248592 A1 | 8/2016 | Hawblitzel et al. | |
| 2017/0257365 A1 | 9/2017 | Gonzalez et al. | |
| 2018/0052720 A1 | 2/2018 | Ionescu et al. | |
| 2019/0004916 A1 | 1/2019 | Martinez et al. | |
| 2019/0027890 A1 | 1/2019 | Louot et al. | |
| 2019/0080081 A1* | 3/2019 | Goodridge | G06F 9/445 |
| 2020/0133735 A1 | 4/2020 | Zhao et al. | |
| 2021/0136100 A1 | 5/2021 | Gupta et al. | |
| 2021/0160068 A1 | 5/2021 | Wu | |
| 2021/0392155 A1* | 12/2021 | Waplington | H04L 63/1433 |
| 2022/0035923 A1 | 2/2022 | Pappachan et al. | |
| 2022/0109581 A1* | 4/2022 | Ledworowski | H04L 9/0894 |
| 2023/0072264 A1 | 3/2023 | Coccia | |
| 2023/0319044 A1 | 10/2023 | Warnicke et al. | |

OTHER PUBLICATIONS

Git, "10.3 Git Internals—Git References," https://git-scm.com/book/en/v2/Git-Internals-Git-References, retrieved Oct. 21, 2021, 4 pages.
"GitBOM," retrieved from https://gitbom.dev/, on May 24, 2022, 5 pages.
Cisco, "Cisco Cyber Vision," retrieved from https://www.cisco.com/c/en/us/products/security/cyber-vision/index.html, May 25, 2022, 17 pages.
Cisco, "Cisco Completes Acquisition of Kenna Security," Press Release, https://newsroom.cisco.com/c/r/newsroom/en/us/a/y2021/m06/cisco-completes-acquisition-of-kenna-security.html, Jun. 30, 2021, 5 pages.
Durai, et al., "CSR 1000V Software Architecture," Virtual Routing in the Cloud, Cisco Press, https://www.ciscopress.com/articles/printerfriendly/2514909, Jan. 16, 2019, 34 pages.
The White House, "Executive Order on Improving the Nation's Cybersecurity," Briefing Room, Presidential Actions, https://www.whitehouse.gov/briefing-room/presidential-actions/2021/05/12/executive-order-on-improving-the-nations-cybersecurity/, May 12, 2021, 19 pages.
Hendrick, "Software Bill of Materials (SBOM) and Cybersecurity Readiness," The Linux Foundation, Research, https:/linuxfoundation.org/wp-content/uploads/LFResearch_SBOM_Report_final.pdf., Jan. 2022, 72 pages.
National Telecommunications and Information Administration, "Software Bill of Materials Elements and Considerations," Federal Register, vol. 86, No. 104, Jun. 2, 2021, 4 pages.
The United States Department of Commerce, NTIA, "The Minimum Elements For a Software Bill of Materials (SBOM)," https://www.ntia.doc.gov/files/ntia/publications/sbom_minimum_elements_report.pdf, Jul. 12, 2021, 28 pages.
Voit, et al., "Attestation Results for Secure Interactions," draft-ietf-rats-ar4si-02, IETF, RATS Working Group, Internet-Draft, Mar. 7, 2022, 40 pages.
Edgeless Systems, "MarbleRun," retrieved from https://docs.edgeless.systems/marblerun/#/, on May 25, 2022, 3 pages.
Edgeless Systems, "Marblerun—The service mesh for Confidential Computing," https://blog.edgeless.systems/why-we-need-a-service-mesh-for-confidential-computing-part-3-3-ffc00b2c3508, Nov. 27, 2020, 5 pages.
Sonatype, "Nexus Open Source Vulnerability Scanner," Software Bill of Materials, retrieved from https://www.sonatype.com/products/vulnerability-scanner, on May 25, 2022, 8 pages.
Gitplanet, "Top 103 reconnaissance open source projects," retrieved from https://gitplanet.com/label/reconnaissance, on May 25, 2022, 8 pages.
Bals, "What is a software bill of materials (SBOM)?," Synopsys, https://www.synopsys.com/blogs/software-security/software-bill-of-materials-bom/, Mar. 16, 2022, 10 pages.
Black, "GitBOM: Enabling UniversalArtifact Traceability In SoftwareSupply Chains," GitBOM, Whitepaper, https://gitbom.dev/resources/whitepaper/, Jan. 25, 2022, 11 pages.
Bates A., et al, "Trustworthy Whole-System Provenance for the Linux Kernel", Retrieved from https://www.usenix.org/conference/usenixsecurity15/technical-sessions/presentation/bates on Jul. 8, 2022, pp. 1-3.
Gitbom: "Automatic and Verifiable Artifact Resolution", Github, Retrieved from https://github.com/git-bom, on Jul. 8, 2022, pp. 1-3.
Intel: "Strengthen Enclave Trust with Attestation", Retrieved from https://www.intel.com/content/www/us/en/developer/tools/software-guard-extensions/attestation-services.html, on Jul. 8, 2022, pp. 1-5.
Wikipedia: "Remote Procedure Call", Retrieved from https://en.wikipedia.org/wiki/Remote_procedure_call, on Jul. 8, 2022, pp. 1-6.
Wikipedia: "Representational State Transfer", Retrieved from https://en.wikipedia.org/wiki/Representational_state_transfer, on Jul. 8, 2022, pp. 1-8.

* cited by examiner

ADMISSION CONTROL BASED ON UNIVERSAL REFERENCES FOR HARDWARE AND/OR SOFTWARE CONFIGURATIONS

TECHNICAL FIELD

The present disclosure relates to computing security, and more specifically, to performing admission control tasks based on universal references for hardware and/or software configurations.

BACKGROUND

In the field of computing network security, admission control is a validation process in communication systems where a check is performed before a communication channel is established between local and/or remote computing resources. The check can determine whether a given computing resource may safely communicate with another computing resource, and can be based on the identity of the computing resource, the protocol that is used for communication, the software and/or hardware configuration of the computing resource, and the like.

When performing admission control, knowledge about the identity of a software and/or hardware computing resource is desired, but sometimes can be insufficient. In order to make fully informed decisions, an admission control system would benefit from having additional details, such as the kernel of the system in which software is executing, the hardware state of the device upon which software is executing, the configuration of the running software, and other additional details.

DESCRIPTION OF EXAMPLE EMBODIMENTS

Overview

Figure 1:
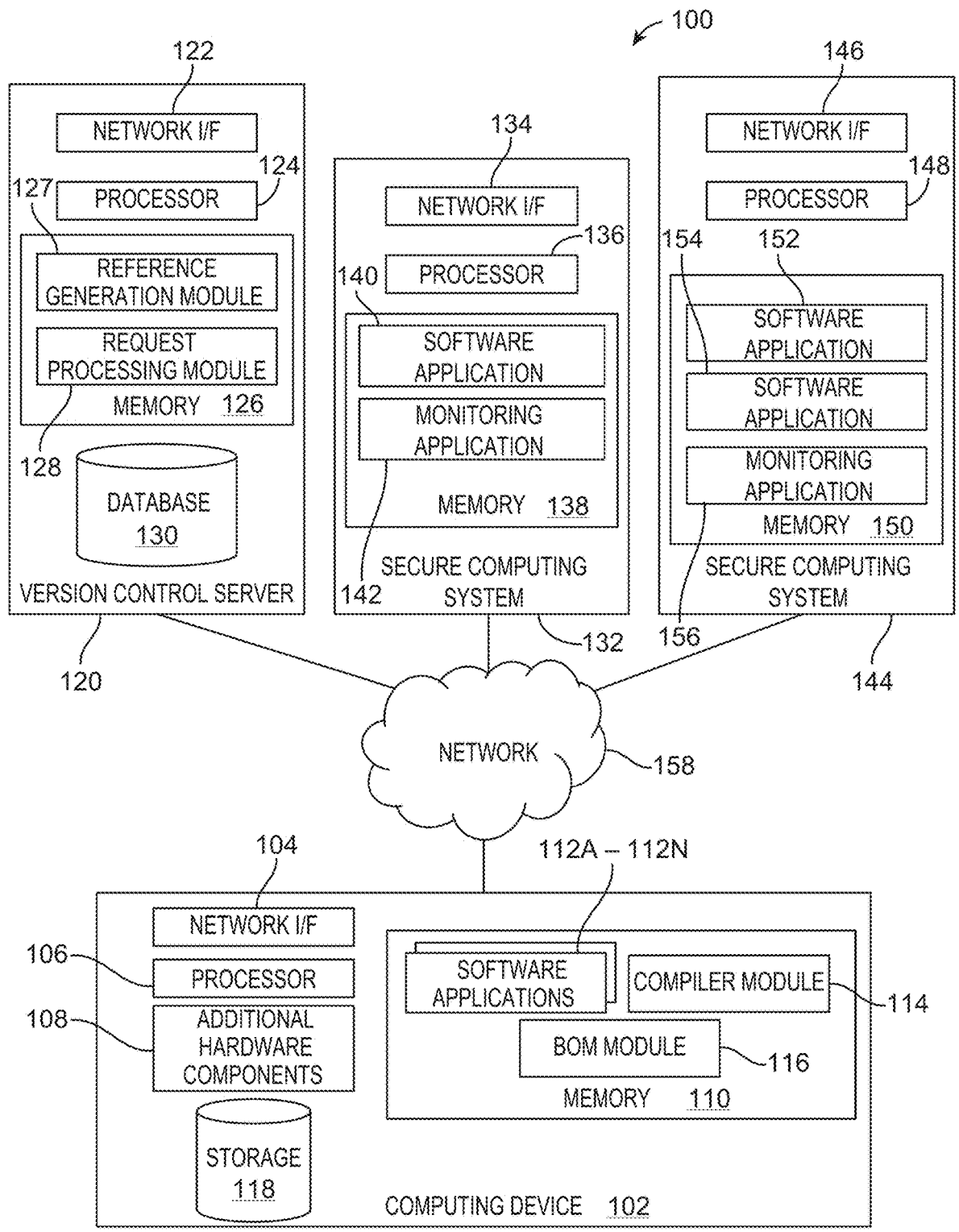
FIG. 1 is a block diagram depicting an environment for performing admission control tasks, in accordance with an example embodiment.

According to one embodiment, techniques are provided for performing admission control tasks. A universal reference for an executing application is obtained, wherein the universal reference identifies one or more components of the executing application by additional universal references assigned to the one or more components. A description of the executing application is determined by enumerating each additional universal reference of the one or more components and additional sub-components, wherein the description exhaustively identifies components and sub-components of the executing application. The identified one or more components and sub-components are assessed to perform an admission control operation between the executing application and a second application.

Example Embodiments

Embodiments are provided for performing computing security tasks, and more specifically, for performing admission control tasks based on universal references for hardware and/or software configurations.

In the field of network security, network administrators seek to protect the integrity, confidentiality, and availability of computer networks, data, and devices using a variety of technologies. Inventory, or knowledge of a computing entity's software and hardware configurations, can be extremely useful for security purposes, as individual components can be associated with specific vulnerabilities. For admission control, the decision of whether or not to establish a trusted communication session between computing entities may depend on the software and hardware of either or both computing entities; for example, if any software or hardware components of a computing entity are associated with a security threat, then communication with that entity may not be desired. However, conventional approaches to admission control are unable to readily obtain a comprehensive listing of software components and/or hardware components of a computing entity, and there is no consistent, universal approach to describing the constituent elements of a hardware and/or software configuration.

Accordingly, present embodiments solve this problem by providing a universal reference that is unique for each combination of hardware and/or software elements. As referred to herein, a computing entity can be defined as any combination of software and/or hardware elements. The universal reference can have a small data footprint (e.g., 20 bytes), and can be used to determine with specificity an exhaustive listing of all components of a computing entity. This universal reference is obtained by representing software and/or hardware components using a hierarchical description in which relationships between components and sub-components are defined. A universal reference can then be generated for each component in the hierarchical description based on the sub-components immediately beneath the component in the hierarchical description. By nature of the hierarchical description, the universal references of the components and sub-components enable an exhaustive description of any software and/or hardware configuration to be obtained via a single universal reference. In particular, the hierarchical description may be similar to a Merkle tree, in which leaf nodes are labeled with hashes of data blocks, and non-leaf nodes store hashes of child nodes. The relationships between universal references and the components of the computing entity with which each universal reference is associated can be stored in a trusted repository. The repository can be queried using a universal reference to identify the hardware/software components of the computing resource corresponding to that universal reference. Additionally, universal references can be used to quickly determine whether a particular software and/or hardware configuration includes any known good and/or bad components.

Thus, present embodiments provide the practical application of enabling any software and/or hardware configuration to be succinctly and exhaustively described, no matter how complex, in a uniform manner by providing a universal reference to describe any possible combination of constituent hardware and/or software elements. The knowledge of constituent software and/or hardware elements, or inventory, can be used for admission control by determining whether a computing entity includes any hardware or software with known vulnerabilities, exploits, or other issues. Moreover, the admission control tasks can extend to secure enclaves, which are computing environments in which a processor performs hardware-level isolation and memory encryption in order to isolate application code and data. This can be accomplished by validating the identity of the secure enclave via remote attestation, and correlating this identity with the universal reference. From there, the universal reference can be traced back to its constituent software components. Accordingly, claimed embodiments improve the fields of computer and network security by enabling an exhaustive description of any combination of software and/or hardware to be easily captured using a lightweight universal reference that can, for example, be inserted into requests to admission control systems, compiled into software to provide self-referential executables, and/or otherwise shared in order to achieve any desired computing security goal.

It should be noted that references throughout this specification to features, advantages, or similar language herein do not imply that all of the features and advantages that may be realized with the embodiments disclosed herein should be, or are in, any single embodiment. Rather, language referring to the features and advantages is understood to mean that a specific feature, advantage, or characteristic described in connection with an embodiment is included in at least one embodiment. Thus, discussion of the features, advantages, and similar language, throughout this specification may, but do not necessarily, refer to the same embodiment.

Furthermore, the described features, advantages, and characteristics may be combined in any suitable manner in one or more embodiments. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages will become more fully apparent from the following drawings, description and appended claims, or may be learned by the practice of embodiments as set forth hereinafter.

Embodiments are now described in detail with reference to the figures. FIG. 1 is a block diagram depicting an environment 100 for performing admission control tasks, in accordance with an example embodiment. As depicted, environment 100 includes a computing device 102, a version control server 120, secure computing systems 132 and 144, and a (communication) network 158. It is to be understood that the functional division among components of environment 100 have been chosen for purposes of explaining various embodiments and is not to be construed as a limiting example.

Computing device 102 includes a network interface (I/F) 104, at least one processor 106, additional hardware components 108, memory 110, and storage 118. Memory 110 stores software instructions for software applications 112A-112N, a compiler module 114, and a Bill of Materials (BOM) module 116. Computing device 102 may include, for example, a laptop computer, a tablet computer, a netbook computer, a personal computer (PC), a desktop computer, a personal digital assistant (PDA), a smart phone, a thin client, a rack-mounted server, or any programmable electronic device capable of executing computer readable program instructions. Network interface 104 may include one or more network interface cards, line cards, etc., and enables components of computing device 102 to send and receive data over a network, such as network 158. In general, computing device 102 represents any configuration of software and/or hardware components that can be described using a universal reference in accordance with the embodiments presented herein. Computing device 102 may include internal and external hardware components, as depicted and described in further detail with respect to FIG. 10.

Additional hardware components 108 may include any hardware elements associated with computing device 102, each of which can be described using a universal reference. Additionally, the constituent elements of each of the additional hardware components 108 can also be described with a universal reference. For example, a camera may have a universal reference for itself that indicates a component of the camera, such as a particular complementary metal-oxide semiconductor (CMOS) image sensor, via another universal reference. As a non-exhaustive listing for illustrative purposes, additional hardware components 108 can include cameras, graphical processing units (GPUs), peripheral devices (keyboards, mice, microphones, speakers, etc.), application-specific integrated circuits (ASICs), sensors, batteries, and the like. In some embodiments, computing device 102 may be a computer associated with a vehicle, robot, scientific equipment, diagnostic device, and the like, and additional hardware components 108 may include specialized elements such as motors, lasers, transceivers, robotic components, propellers, x-ray generators, liquid pumps, transducers, and the like.

Software applications 112A-112N, compiler module 114, and BOM module 116 may include one or more modules or units to perform various functions of the embodiments described below. Software applications 112A-112N, compiler module 114, and BOM module 116 may be implemented by any combination of any quantity of software and/or hardware modules or units, and may reside within memory 110 of computing device 102 for execution by a processor, such as processor 106.

Software applications 112A-112N can include any executable software application, each of which can be described using a universal reference. Additionally, the modules that constitute each software application 112A-122N can also be described with their own universal reference. For example, a software application may be assigned a universal reference that indicates that the software application includes a plug-in or extension, and the plug-in or extension can be assigned its own universal reference (which is referenced by the parent software application's universal reference). Software applications 112A-112N can include, for example, word processors, web browsers, games and entertainment applications, mail and calendar applications, control software, modeling software, computer aided design (CAD) software, firmware, and any other executable software. In some embodiments, software applications 112A-112N that are compiled by computing device 102 may be provided to other computing systems (e.g., secure computing systems 132 and 144), and executed by those systems. Software applications 112A-112N may include applications that execute in secure enclaves, (e.g., using one or more processors that support hardware-level isolation and/or memory encryption).

Compiler module 114 may include any conventional or other compiler that translates computer code written in one programming language into another language (e.g., machine-language instructions). Compiler module 114 may generate one or more of software applications 112A—112N. In order to create self-referential software objects, compiler module 114 may receive or obtain a universal reference for the software object being compiled and insert the universal reference into the compiled software object in a manner that embeds the software object's universal reference into the software object. Thus, a software object can self-identify using its universal reference for attestation and other security tasks.

BOM module 116 manages one or more bills of materials for software and/or hardware associated with computing device 102. A bill of materials is a list of components for a computing entity, including any software or hardware object. Each bill of materials may have a hierarchical schema in which the top level represents an object itself and lower levels represent sub-components. Each component can be referenced in a bill of material by any identifier, including a name, version number, universal unique identifier (UUID), hardware identifier (e.g., vendor-defined strings used to identify devices), and the like. In some embodiments, BOM module 116 scans computing device 102 and obtains bills of materials for each hardware and/or software component. BOM module 116 may obtain bills of materials from one or more network-accessible locations associated with manufacturers or vendors. In some embodiments, one or more bills of materials are provided to computing device 102 by the software and/or hardware components themselves. BOM module 116 may analyze a bill of materials for a particular software application prior to compilation, so that a universal reference can be generated in accordance with present embodiments, and the universal reference can be inserted into the software application to generate a self-referential software application.

Storage 118 may include any non-volatile storage media known in the art. For example, storage 118 can be implemented with a tape library, optical library, one or more independent hard disk drives, or multiple hard disk drives in a redundant array of independent disks (RAID). Similarly, data in storage 118 may conform to any suitable storage architecture known in the art, such as a file, a relational database, an object-oriented database, and/or one or more tables. Storage 118 may store data relating to software and/or hardware components of computing device 102, including bills of materials, universal references for computing entities, and compiled applications (e.g., executable instructions corresponding to software applications 112A-112N).

Version control server 120 includes a network interface (I/F) 122, at least one processor 124, memory 126, and a database 130. Memory 126 stores software instructions for a reference generation module 127 and a request processing module 128. Version control server 120 may include a rack-mounted server, or any other programmable electronic device capable of executing computer readable program instructions. Network interface 122 may include one or more network interface cards, line cards, etc., and enables components of version control server 120 to send and receive data over a network, such as network 158. In general, version control server 120 creates universal references, stores associations between software and/or hardware configurations and their respective universal references, and processes queries to identify the components of computing entities based on their universal references. In some embodiments, version control server 120 performs other distributed version control system functions, and may include, for example, a Git server. Version control server 120 may include internal and external hardware components, as depicted and described in further detail with respect to FIG. 10. Version control server 120 may be embodied as a software application 112A-112N running on a computing device 102 and/or as a software application running on secure computing systems 132 and/or 144.

Reference generation module 127 and request processing module 128 may include one or more modules or units to perform various functions of the embodiments described below. Reference generation module 127 and request processing module 128 may be implemented by any combination of any quantity of software and/or hardware modules or units, and may reside within memory 126 of version control server 120 for execution by a processor, such as processor 124.

Reference generation module 127 may generate universal references for computing entities in accordance with present embodiments. A computing entity can include software, hardware, firmware, or combinations thereof, such as an executable software object, runtime libraries used by the software object at execution, and the hardware configuration upon which the software object executes. These hardware/software elements may also be referred to as artifacts. In general, a computing entity's artifacts are processed by reference generation module 127 to generate universal references. The contents of each artifact are stored in the reference generation module 127 as an object. Each object may be stored as a binary file (e.g., a Git binary large object (blob)). A universal reference is created for each object by computing a cryptographic hash of the object. If the artifact contains child artifacts, the universal references of those child artifacts are combined into another object, referred to as the bill of materials (BOM) object, which is hashed to create the BOM universal reference for these child artifacts. Universal references for the immediate leaf nodes of the given artifact are listed alongside a BOM universal reference of any child nodes to create a hierarchical representation of the artifact and its subcomponents.

Thus, the specific BOM object (e.g., Git reference) that is associated with the parent artifact at the very top of the hierarchical representation will include the universal references of its immediate child artifacts; each child artifact's own universal reference indicates its child artifacts, etc., thus enabling a computing entity to be exhaustively described using a single BOM object (i.e. the hash of the object of the uppermost parent artifact of the hierarchy combined with the hash of the child artifacts' BOM object universal references). Generation of universal references is depicted and described in further detail with respect to FIGS. 3-5.

Request processing module 128 processes requests that include universal references to determine an exhaustive listing of the components of the computing entities associated with the universal references. The requests may be received from a computing system (e.g., secure computing system 132 and/or 144) during an admission control operation. When a universal reference is received, request processing module 128 may query database 130 to determine the object associated with the universal reference; the contents of the object indicate all of the artifacts that are immediate children of the computing entity by their own universal references. Request processing module 128 may iteratively look up each child artifact's children until a full listing of all components of the computing entity is obtained. Request processing module 128 can then respond to a request with the exhaustive listing of components associated with the computing entity whose universal reference was provided in the request. In some embodiments, request processing module 128 may only provide a portion or subset of the components of a computing entity; for example, if only software components are relevant, then the request may include an indication to only return the software components.

Database 130 may include any non-volatile storage media known in the art. For example, database 130 can be implemented with a tape library, optical library, one or more independent hard disk drives, or multiple hard disk drives in a redundant array of independent disks (RAID). Similarly, data in database 130 may conform to any suitable storage architecture known in the art, such as a file, a relational database, an object-oriented database, and/or one or more tables. Database 130 may store associations between universal references and objects (e.g., Git blobs) that in turn contain other universal references. Database 130 may also store associations between objects and the identities of the particular computing entities that each object represents.

Secure computing system 132 includes a network interface (I/F) 134, at least one processor 136, and memory 138. Secure computing system 144 similarly includes a network interface (I/F) 146, at least one processor 148, and memory 150. Memory 138 of secure computing system 132 stores software instructions for a software application 140 and a monitoring application 142. Memory 150 of secure computing system 144 stores software instructions for software applications 152 and 154 and a monitoring application 156. Secure computing systems 132 and 144 may include a rack-mounted server, or any other programmable electronic device capable of executing computer readable program instructions. The network interfaces (e.g., network interfaces 134 and 146) may include one or more network interface cards, line cards, etc., and enables components of secure computing systems 132 and 144 to send and receive data over a network, such as network 158. In general, secure computing systems 132 and 144 provide secure computing enclaves for desired computing tasks, and can communicate via intra-system and/or inter-system communication sessions subject to an admission control policy that utilizes the universal references described herein. Secure computing systems 132 and 144 may include internal and external hardware components, as depicted and described in further detail with respect to FIG. 10.

Software applications 140, 152, and 154 and monitoring applications 142 and 156 may include one or more modules or units to perform various functions of the embodiments described below. Software applications 140, 152, and 154 and monitoring applications 142 and 156 may be implemented by any combination of any quantity of software and/or hardware modules or units, and may reside within memories 138 and 150 of secure computing systems 132 and 144, respectively, for execution by a processor, such as processors 136 and 148.

Software applications 140, 152, and 154 may each include any software application that performs any desired operations, either independently or collectively. In some embodiments, software applications 140, 152, and/or 154 function as peers in a federated computing system. As such, software applications 140, 152, and 154 may communicate with each other via intra-system and/or inter-system communication sessions. For example, software application 140 may establish an inter-system communication session with software application 152, and/or software application 152 may establish an intra-system communication session with software application 154. Some or all of the code of software applications 140, 152, and/or 154 may be executed in a confidential computing environment that utilizes processor hardware-level secure computing enclaves. Secure computing enclaves are depicted and described in further detail with respect to FIG. 6.

Software applications 140, 152, and 154 may be compiled by computing device 102, compiled by another computing device, or compiled locally, according to the techniques presented herein for generating universal references for computing entities. Accordingly, the universal reference for each software application 140, 152, and 154 may be known; for example, the universal references may be inserted in each software application 140, 152, and 154 at compilation, or stored with each software application 140, 152, and 154 as metadata, etc.

Monitoring applications 142 and 156 may perform admission control operations with regard to communication sessions between software applications. Monitoring application 142 may perform admission control operations that involve software application 140, and monitoring application 156 may perform admission control operations that involve software applications 152 and/or 154. Monitoring applications 142 and 156 may obtain the universal references of software applications and perform admission control by comparing universal references to a list that indicates whether a particular universal reference corresponds to software that should be trusted (approved) or not (denied). Additionally or alternatively, monitoring applications 142 and 156 can expand a single universal reference into an exhaustive list of universal references for a computing entity by sending the universal reference to version control server 120 for processing by request processing module 128. Thus, monitoring applications 142 and 156 can determine, using a single universal reference, the entire makeup of a particular computing entity, and thereby determine whether the computing entity has any particular software and/or hardware components that are flagged as untrustworthy.

In some embodiments, monitoring applications 142 and 156 perform admission control tasks by maintaining an inventory of software applications' constituent components using their universal references. Thus, when a zero-day exploit becomes known that affects a particular software component, the affected software applications can be immediately identified. In some embodiments, active communication sessions may be terminated in response to one of the participating applications being identified as unsecure.

Monitoring applications 142 and/or 156 may intercept requests from software applications 140, 152, and/or 156 to engage in communication sessions between each other in order to support a federated computing system. A monitoring application may authorize communication between a local software application and a remote application by using the universal reference of the remote application and/or the local application to determine whether communication between the two applications is permissible. For example, in order to perform admission control between software application 140 and software application 152, monitoring application 142 may receive the universal reference of software application 152, analyze the universal reference to confirm that software application 152 has no known vulnerabilities, and then admit software application 140 to engage in communication with software application 152. Admission control can be performed on a universal reference level by comparing universal references against a known good or known bad list, or admission control can be performed by using the universal references to obtain an exhaustive listing of components and sub-components of a software application, which can be compared against a known good or known bad list. In some embodiments, admission control is determined based on the presence of components; for example, a software application may be required to include a particular component, or combination of components.

Network 158 may include a local area network (LAN), a wide area network (WAN) such as the Internet, or a combination of the two, and includes wired, wireless, or fiber optic connections. In general, network 158 can be any combination of connections and protocols known in the art that will support communications between computing device 102, version control server 120, and/or secure computing systems 132 and 144 via their respective network interfaces in accordance with the described embodiments.

Figure 2:
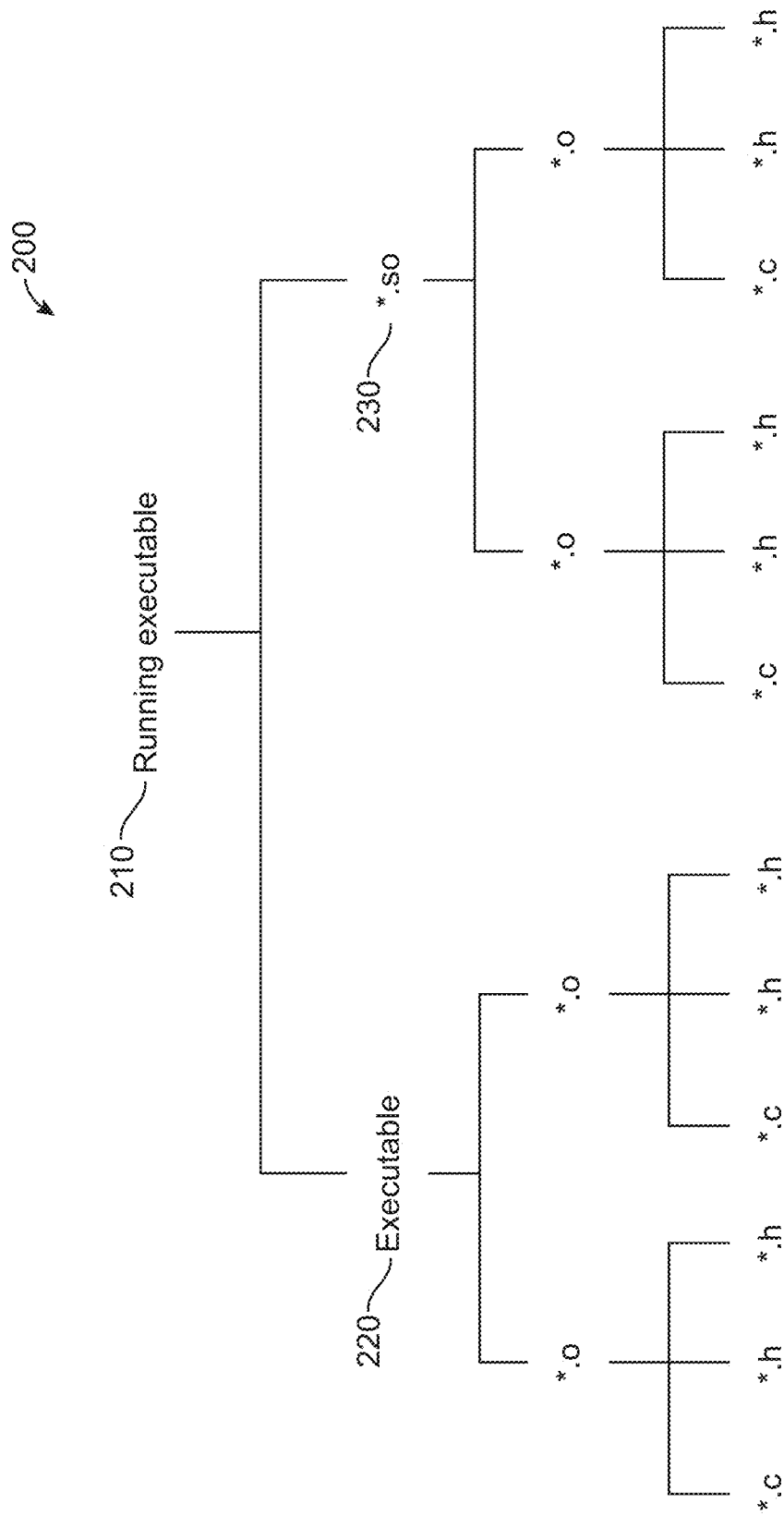
FIG. 2 is a tree diagram depicting a hierarchical description of a computing entity's artifacts, in accordance with an example embodiment.

FIG. 2 is a tree diagram depicting a hierarchical description 200 of a computing entity, in accordance with an example embodiment. In the depicted embodiment, the computing entity represented by hierarchical description 200 may include a C or C++ running executable 210. Running executable 210 may include as immediate child artifacts executable 220 and dynamic library 230 (*.so), which is not embedded in the binary of executable 220 but is utilized at runtime. Hierarchical description 200 also indicates that executable 220 includes child artifacts (*.o) which also have child artifacts (*.c, *.h); likewise, dynamic library 230 includes child artifacts (*.o) that also have child artifacts (*.c, *.h). Accordingly, hierarchical description 200 may represent an exhaustive description of the components of running executable 210, and as such, can be used for various security purposes, such as attestation and other tasks.

Figure 3:
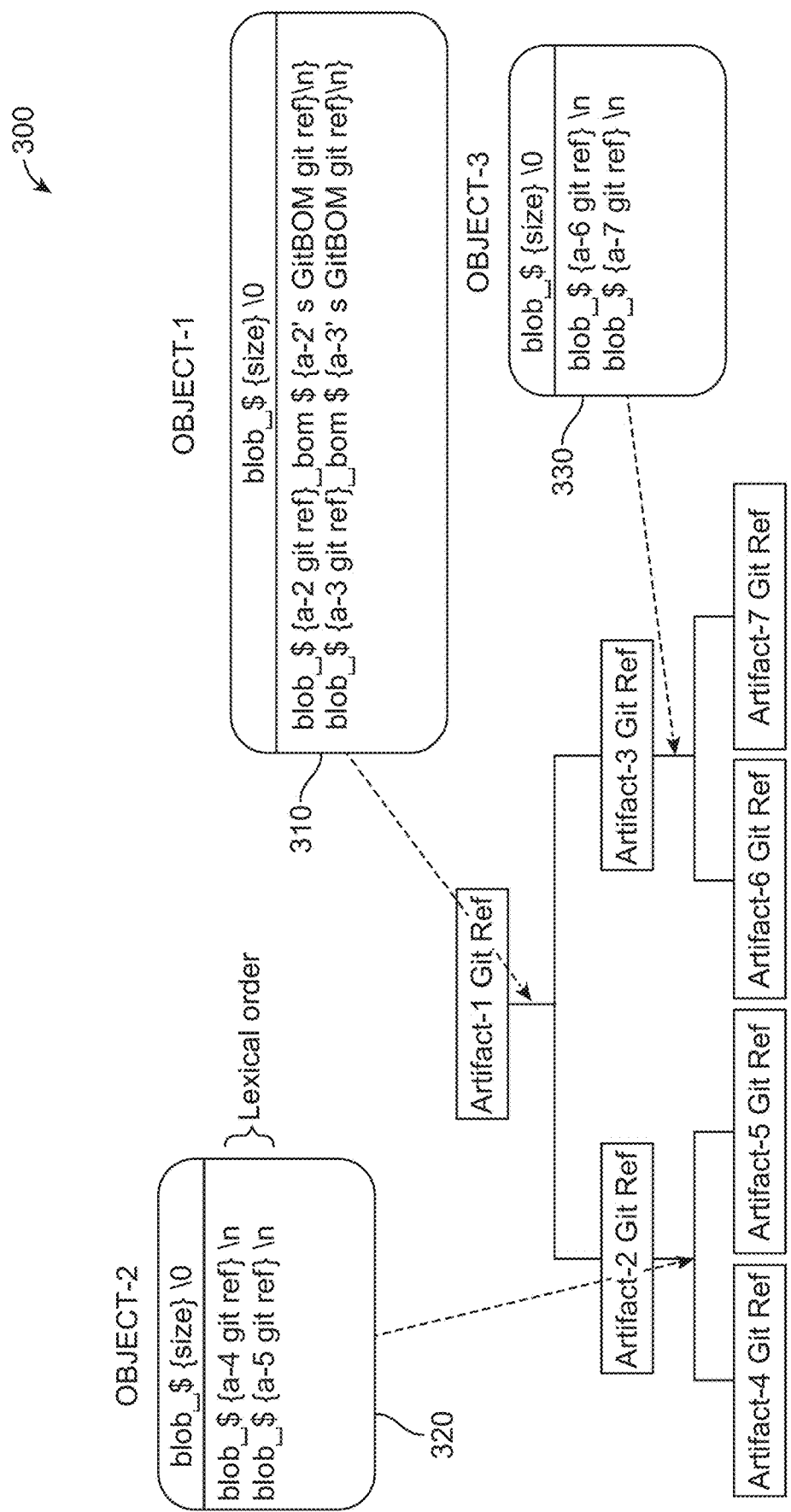
FIG. 3 is a tree diagram depicting a hierarchical description of universal references for a computing entity's artifacts composed into bill of materials (BOM) objects, in accordance with an example embodiment.

FIG. 3 is a tree diagram depicting a hierarchical description 300 of universal references for a computing entity's artifacts composed into bill of materials (BOM) objects, in accordance with an example embodiment. As depicted, a top-level BOM object ("object-1") has two immediate children ("object-2" and "object-3") which also have two immediate children each. Object-1 is a BOM object 310, which may be structured as a Git blob. The contents of object 310 include the universal references (e.g., "git ref" or "git object identifier" ("Gitoid"), etc.) of its immediate children, artifact-2 and artifact-3 along with universal references to their BOM objects (e.g., "gitBOM git references," "git refs," or "Gitoid"). Likewise, object 320, which is associated with artifact-2, includes as contents the universal references to its immediate children ("artifact-4" and "artifact-5"), and object 330, which is associated with artifact-3, includes as contents the universal references to its immediate children ("artifact-6" and "artifact-7").

Figure 4:
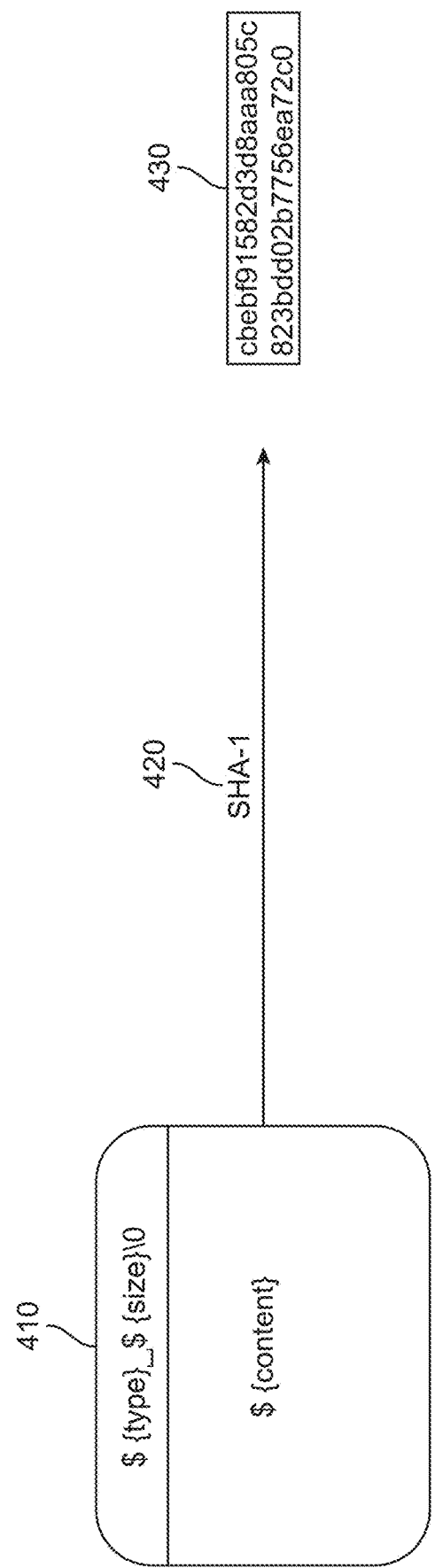
FIG. 4 is a block diagram depicting a universal reference being generated based on an object, in accordance with an example embodiment.

FIG. 4 is a block diagram depicting a universal reference 430 being generated based on an object 410, in accordance with an example embodiment. As depicted, object 410 has contents that can include one or more universal references for the immediate child artifacts of the artifact to which object 410 corresponds. A hashing algorithm 420, such as Secure Hash Algorithm 1 (SHA-1), may be applied to object 410 to generate universal reference 430, which may be a 40-character hexadecimal string. In various embodiments, the hashing algorithm 420 that is applied may include a collision-resistant hashing algorithm in order to ensure that universal references are unique for unique combinations of hardware and/or software.

Figure 5:
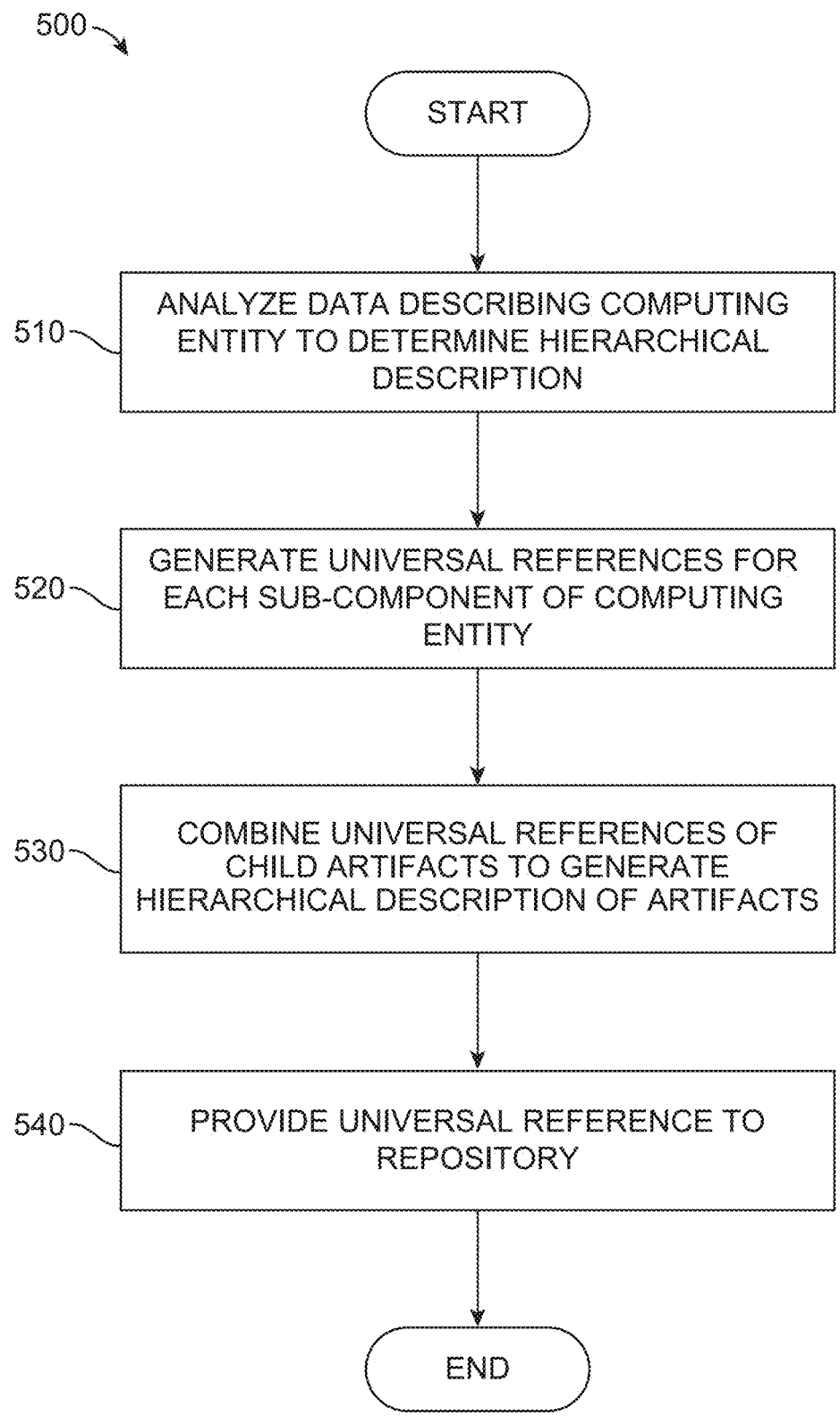
FIG. 5 is a flow chart depicting a method for generating a universal reference, in accordance with an example embodiment.

FIG. 5 is a flow chart depicting a method 500 for generating a universal reference, in accordance with an example embodiment.

Data describing a computing entity is analyzed to determine a hierarchical description at operation 510. The data may include a bill of materials (BOM) for the computing entity. In some embodiment, the BOM is a structured document that describes the components of the computing entity, and the relationships between components are explicitly defined, enabling the hierarchical description to be directly determined. In some embodiments, the BOM is at least partially unstructured, and relationships between components may require extraction by processing the BOM. In one embodiment, a natural language processing model may be utilized to analyze an unstructured description of a computing entity in order to extract relationships between components. The natural language processing model may be trained using a set of training data that includes examples of unstructured descriptions and the corresponding hierarchical descriptions based on those unstructured descriptions. In some embodiments there is no BOM and operation 510 requires evaluation of the artifacts' development, integration, and/or relationships such as might be contained in a version control server. Each artifact of the hierarchical description may be provided with a BOM object (e.g., a Git blob) whose contents cite, via universal references, the immediate child artifacts.

Universal references for each sub-component of the computing entity are generated at operation 520. Each sub-component may be processed using an algorithm, such as a collision-resistant hashing algorithm, to produce a string that is used as the universal reference. The algorithm may output strings of uniform length so that all universal references occupy a same number of bits. In some embodiments, any metadata contained in the object may be removed, so that same hardware or software components that include different descriptive or other details may be correctly mapped to the same universal references.

The universal references of child artifacts are combined to generate a hierarchical description of the artifacts at operation 530. This process is repeated for parent artifact, proceeding in a bottom-up approach through each tier of the hierarchy, until an exhaustive universal reference of a computing entity is generated.

The universal reference is provided to a repository at operation 540. Each generated universal reference may be provided to a repository along with the associated identities and/or universal references of the immediate child artifacts of the artifact from which the universal reference was generated. Accordingly, the repository may be queried to determine immediate child artifacts of a computing entity, and, using their universal references, queried again to determine their child artifacts, etc., until an exhaustive description of the computing entity's components is obtained.

Figure 6:
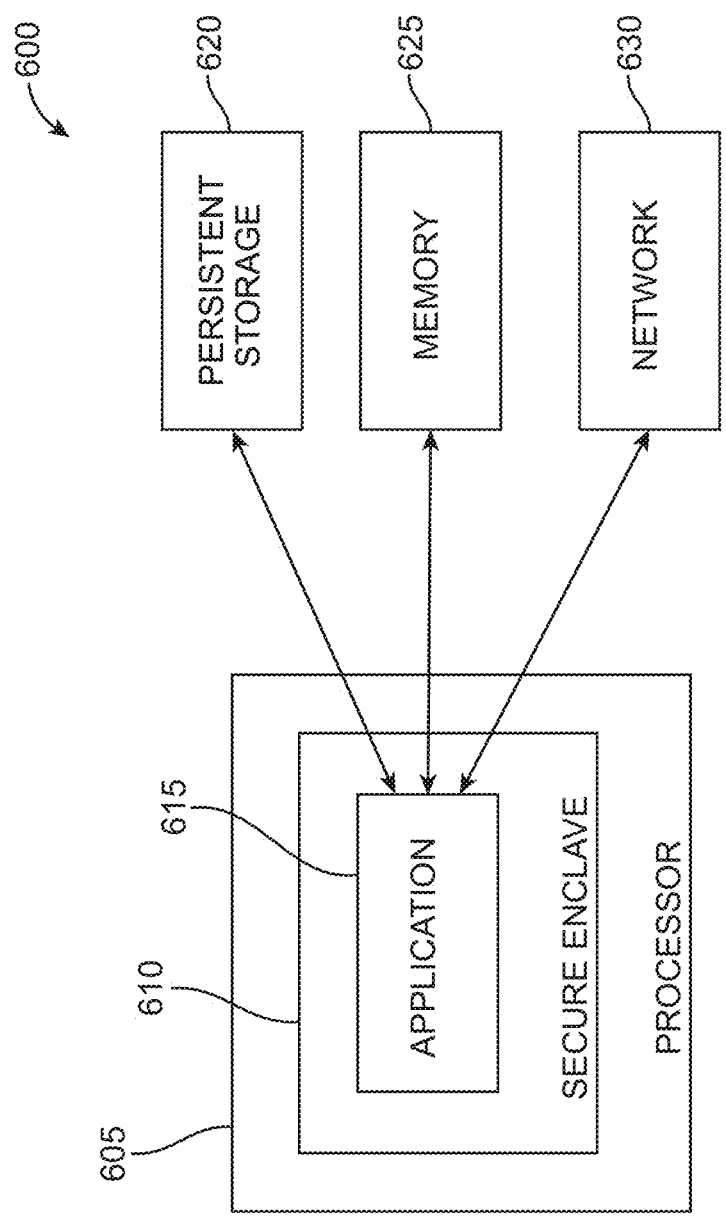
FIG. 6 is a block diagram depicting a secure computing enclave, in accordance with an example embodiment.

FIG. 6 is a block diagram depicting a secure computing enclave 600, in accordance with an example embodiment. As depicted, secure computing enclave 600 includes a processor 605 having a secure enclave 610 in which an application 615 is executing; application 615 may exchange data with one or more of a persistent storage 620, memory 625, and/or network 630.

Processor 605 may include a conventional or other processor, (e.g., a central processing unit (CPU), application-specific integrated circuit (ASIC), etc.) that supports hardware-level secure computing. In particular, processor 605 includes a hardware feature, shown herein as secure enclave 610, in which code can be securely executed in an isolated and encrypted manner. Any code, such as application 615, that is executed inside secure enclave 610 is not exposed to external processes or memory in an unencrypted form.

Data may be exchanged between application 615 and external resources, such as persistent storage 620, memory 625, and/or network 630. The data may be encrypted when shared with an external resource. For example, when data is exchanged between application 615 and persistent storage 620 or memory 625, the data may be encrypted using an Advanced Encrypted Standard (AES) approach. When data is exchanged between application 615 and network 630, the data may be encrypted using a Transport Layer Security (TLS) encryption approach. The data may be exchanged in order to support inter-system and/or intra-system communication sessions, enabling application 615 to participate in a federated computing system and/or to perform other tasks. Secure computing enclave 600 can extend to opaque code, including data in use and/or data at rest, and can include externally verifiable code that is verified according to the code's identity and/or integrity.

Figure 7:
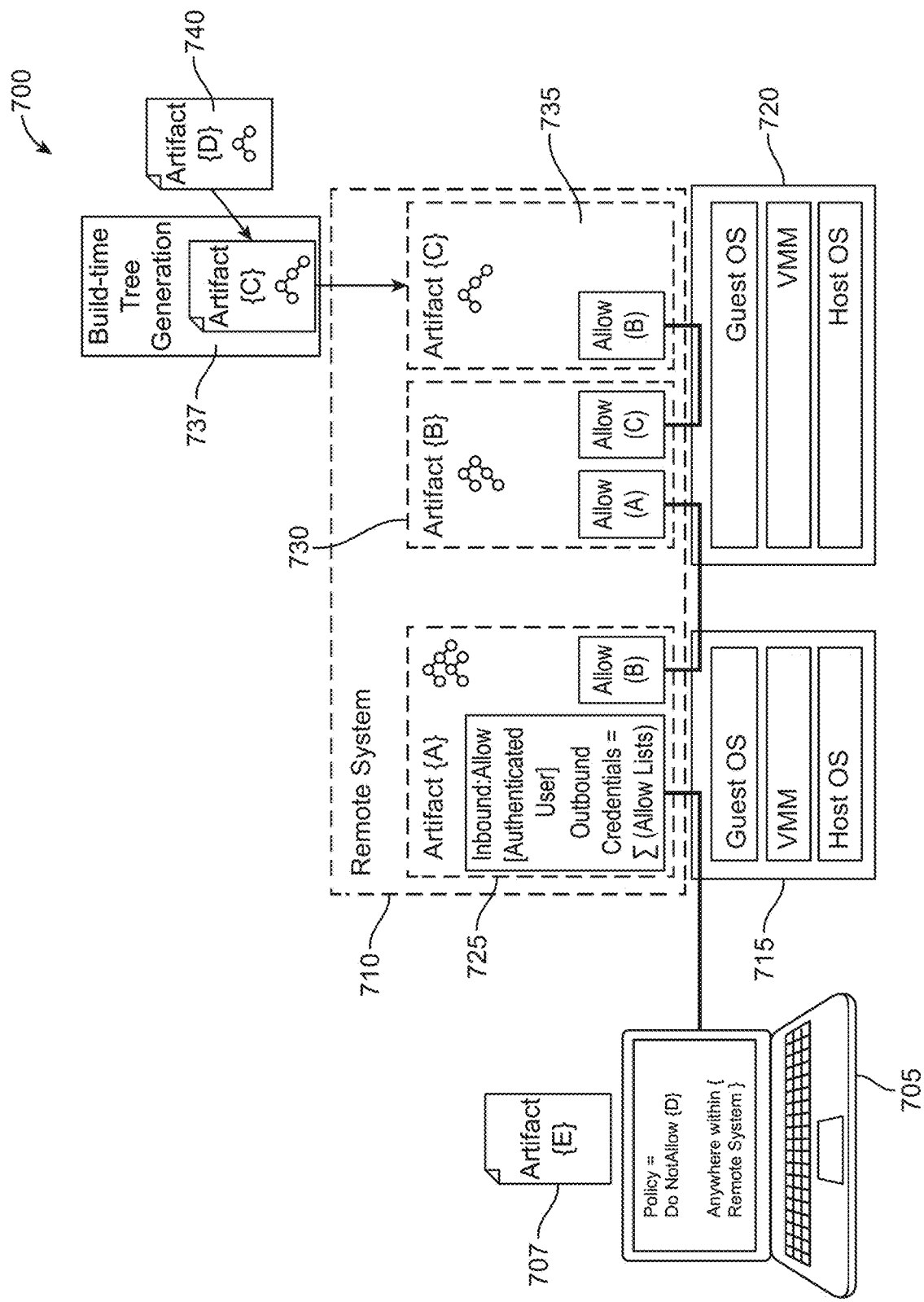
FIG. 7 is a block diagram depicting a computing environment in which admission control is performed, in accordance with one example embodiment.

FIG. 7 is a block diagram depicting a computing environment 700 in which admission control is performed, in accordance with an example embodiment. As depicted, computing environment 700 includes a computing device 705, a remote system 710 that includes servers 715 and 720, and artifacts 725, 730, 735, and 740. Each artifact may correspond to one or more software components, and may be provided with a universal reference.

Initially, computing device 705 may request to interact with remote system 710. An admission control policy may indicate that remote system 710 should not be allowed to interact with any computing entity that includes a particular artifact (e.g., artifact 707, represented as "artifact E"). When computing device 705 requests to interact with remote system 710, the universal references of computing device 705 are sent to remote system 710. Remote System 710 may analyze the components of computing device 705 using the universal references of its components, to determine whether artifact 707 is a sub-component. In this example, computing device 705 is denied admission.

Additionally, servers 715 and 720 of remote system 710 may be mutually attested to each other using universal references. As depicted, server 715 permits communication with artifact 730 (represented as "artifact B"), which is included in server 720, and likewise, server 720 permits communication with artifact 725 (represented as "artifact A"), which is included in server 715. Thus, the connection between servers 715 and 720 may be an inter-system communication session. Also included in remote system 710 is an intra-system communication session, established between artifacts 730 and 735 of server 720. Artifact 735 of server 720 includes build-time tree generation artifact 737, which in turn, includes artifact 740 (represented as "artifact D").

In order to admit remote system to interact with computing device 705, computing device 705 may assess server 715 and server 720 accordingly, for the presence of any sub-component that are disallowed by computing device 705. In the depicted example, server 720 includes, by way of build-time tree generation artifact 737, a disallowed component (i.e., artifact 740). Accordingly, since computing device 705 cannot interact with any system that includes artifact 740, the request to admit remote system 710 is denied.

Figure 8:
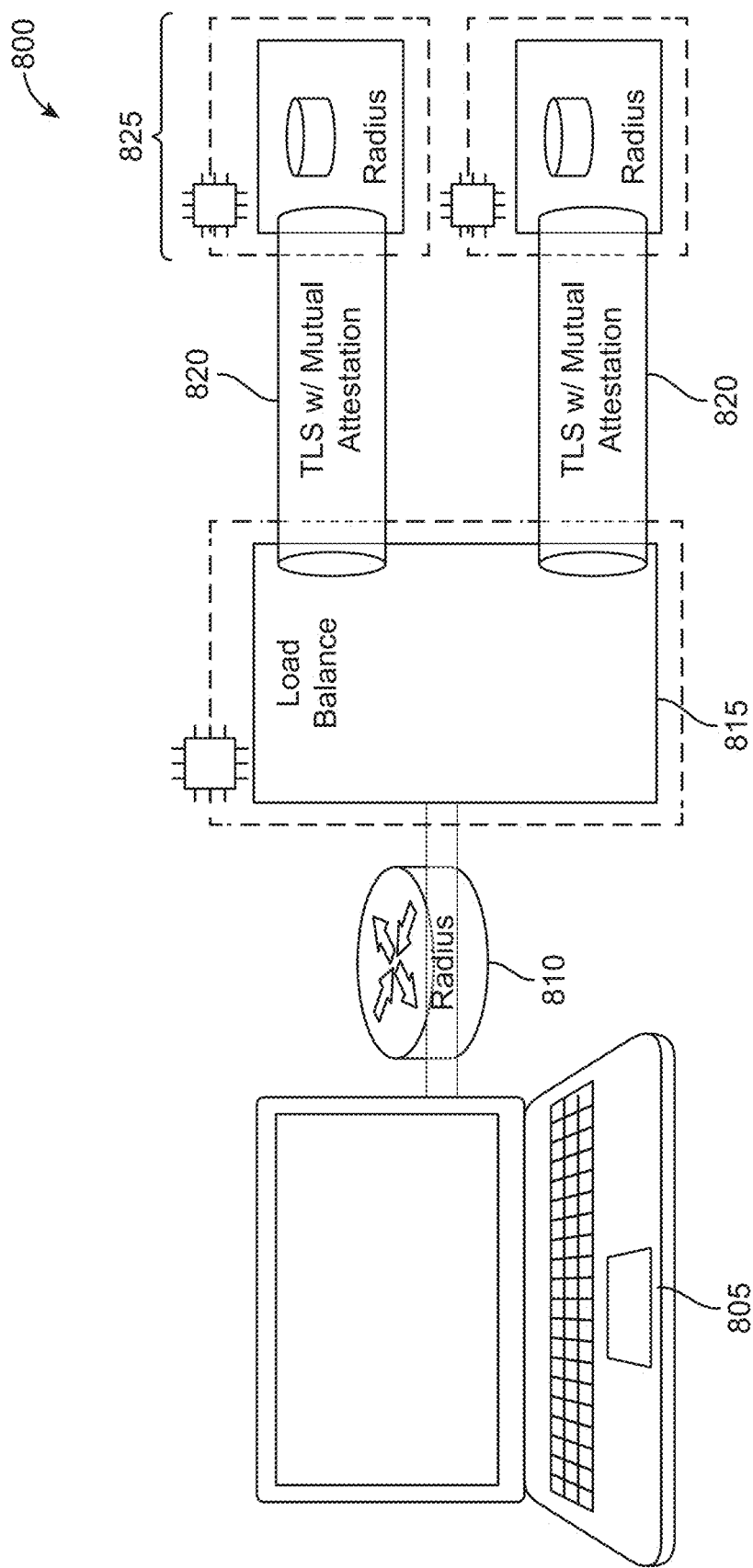
FIG. 8 is a block diagram depicting a computing environment in which admission control is performed, in accordance with another example embodiment.

FIG. 8 is a block diagram depicting a computing environment 800 in which admission control is performed, in accordance with an example embodiment. As depicted, computing environment 800 includes a computing device 805, server 810, load balancer 815, and servers 825. Initially, computing device 805 may request admission to load balancer 815, and server 810 may perform an admission control task to admit computing device 805 to load balancer 815.

Another admission control operation may mutually attest load balancer 815 with one or more servers (e.g., servers 825). Once attested, load balancer 815 can securely communicate with servers 825 via communication sessions 820. Each communication session may further be encrypted to provide additional security (e.g., using a TLS or other encryption standard). In order to mutually attest load balancer with servers 825, each participating system can analyze the other systems' components by exchanging universal references with each other, thereby enabling each system to determine whether communication should be permitted or denied based on the hardware and/or software components of the other system(s). Accordingly, mutually attested enclaves can be established that run trusted software and enable a chain of trust to be established.

Figure 9:
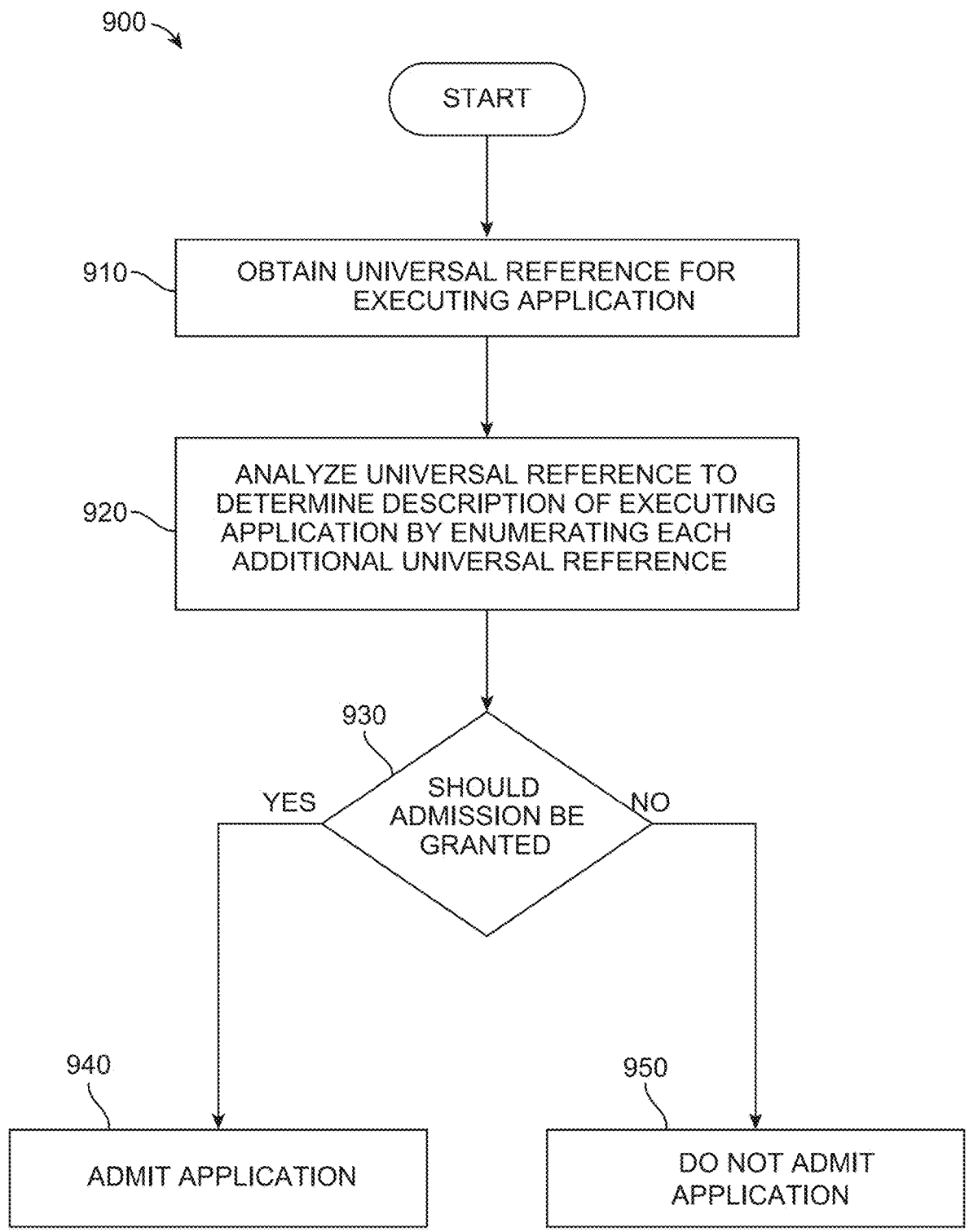
FIG. 9 is a flow chart depicting a method for performing admission control, in accordance with an example embodiment.

FIG. 9 is a flow chart depicting a method 900 for performing admission control, in accordance with an example embodiment.

A universal reference for a computing entity is obtained at operation 910. A computing entity may request admission to a secure computing environment by providing the computing entity's universal reference to an attestation server, which may be one of the servers that is already admitted to the secure computing environment or another server. In some embodiments, admission control is performed to provide a secure enclave, or trusted execution environment, which is a set of system resources that operates in the same security domain and shares the protection of a single, common, continuous security perimeter. The enclave uses the admission control process to prove its identity and build trust with any external services.

The universal reference is analyzed to identify components of the executing application at operation 920. The universal reference can be expanded by querying a repository to determine a description of the executing application that includes an exhaustive listing of components and sub-components of the executing application. Accordingly, the identity and/or universal references of each component and sub-component can be obtained.

Operation 930 determines whether admission should be granted. Any universal references that are obtained can be compared to a list of known trustworthy or untrustworthy references. Additionally or alternatively, each component and sub-component can be compared to a list of known trustworthy or untrustworthy components. Admission control can be performed accordingly in order to attest the computing entity as a whole. If the executing application is permitted, then the executing application may be admitted to the secure computing environment at operation 940; otherwise, the executing application may not be admitted at operation 950.

In some embodiments, there may be levels of trustworthiness based on the severity and/or number of vulnerable components. Additionally or alternatively, some components may be trusted despite containing vulnerabilities because those specific vulnerabilities do not present a risk to the particular secure network. For example, a vulnerability in a computing entity's operating system may not matter to a server running a different operating system. In some embodiments, the executing application is permitted or denied based on a policy that requires a particular component in the other one or more systems. In various embodiments, the executing application may be attested with a local application (e.g., an intra-system communication session), and/or a remote application (e.g., an inter-system communication session).

Figure 10:
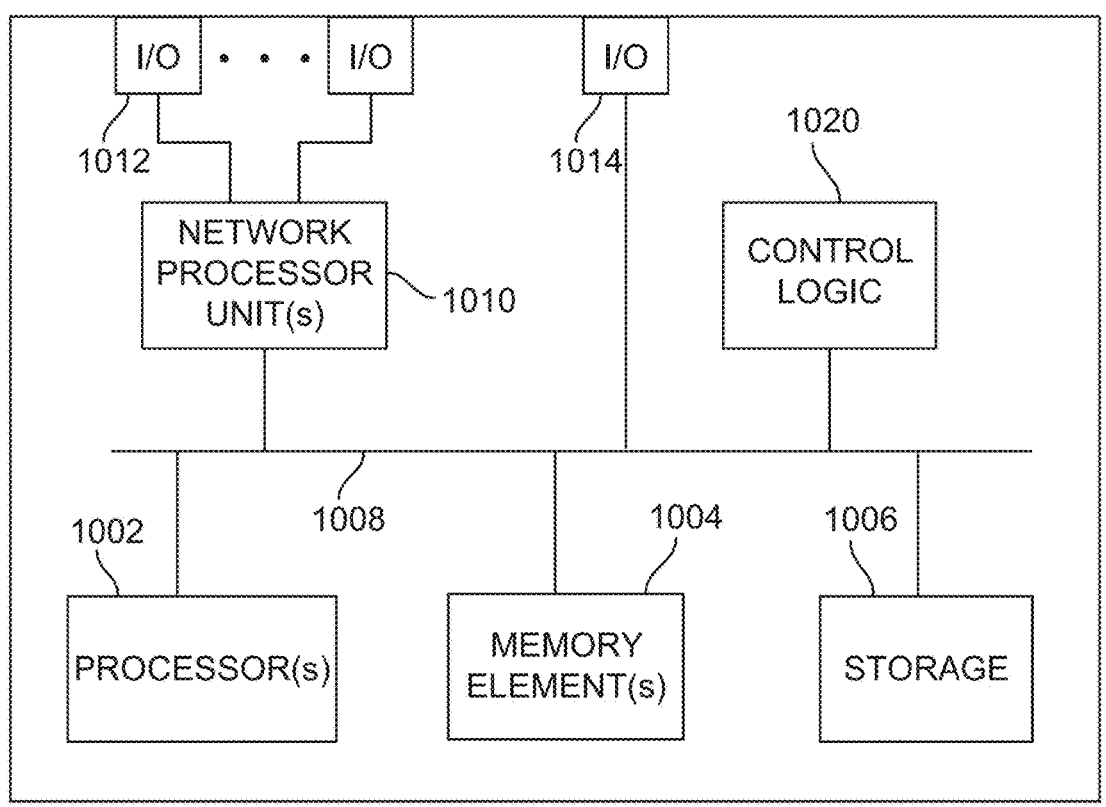
FIG. 10 is a block diagram depicting a computing device configured to generate and/or utilize universal references, in accordance with an example embodiment.

Referring to FIG. 10, FIG. 10 illustrates a hardware block diagram of a computing device 1000 that may perform functions associated with operations discussed herein in connection with the techniques depicted in FIGS. 1-9. In various embodiments, a computing device, such as computing device 1000 or any combination of computing devices 1000, may be configured as any entity/entities as discussed for the techniques depicted in connection with FIGS. 1-9 in order to perform operations of the various techniques discussed herein.

In at least one embodiment, the computing device 1000 may include one or more processor(s) 1002, one or more memory element(s) 1004, storage 1006, a bus 1008, one or more network processor unit(s) 1010 interconnected with one or more network input/output (I/O) interface(s) 1012, one or more I/O interface(s) 1014, and control logic 1020. In various embodiments, instructions associated with logic for computing device 1000 can overlap in any manner and are not limited to the specific allocation of instructions and/or operations described herein.

In at least one embodiment, processor(s) 1002 is/are at least one hardware processor configured to execute various tasks, operations and/or functions for computing device 1000 as described herein according to software and/or instructions configured for computing device 1000. Processor(s) 1002 (e.g., a hardware processor) can execute any type of instructions associated with data to achieve the operations detailed herein. In one example, processor(s) 1002 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 1004 and/or storage 1006 is/are configured to store data, information, software, and/or instructions associated with computing device 1000, and/or logic configured for memory element(s) 1004 and/or storage 1006. For example, any logic described herein (e.g., control logic 1020) can, in various embodiments, be stored for computing device 1000 using any combination of memory element(s) 1004 and/or storage 1006. Note that in some embodiments, storage 1006 can be consolidated with memory element(s) 1004 (or vice versa), or can overlap/exist in any other suitable manner.

In at least one embodiment, bus 1008 can be configured as an interface that enables one or more elements of computing device 1000 to communicate in order to exchange information and/or data. Bus 1008 can be implemented with any architecture designed for passing control, data and/or information between processors, memory elements/storage, peripheral devices, and/or any other hardware and/or software components that may be configured for computing device 1000. In at least one embodiment, bus 1008 may be implemented as a fast kernel-hosted interconnect, potentially using shared memory between processes (e.g., logic), which can enable efficient communication paths between the processes.

In various embodiments, network processor unit(s) 1010 may enable communication between computing device 1000 and other systems, entities, etc., via network I/O interface(s) 1012 (wired and/or wireless) to facilitate operations discussed for various embodiments described herein. In various embodiments, network processor unit(s) 1010 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 1000 and other systems, entities, etc. to facilitate operations for various embodiments described herein. In various embodiments, network I/O interface(s) 1012 can be configured as one or more Ethernet port(s), Fibre Channel ports, any other I/O port(s), and/or antenna(s)/antenna array(s) now known or hereafter developed. Thus, the network processor unit(s) 1010 and/or network I/O interface(s) 1012 may include suitable interfaces for receiving, transmitting, and/or otherwise communicating data and/or information in a network environment.

I/O interface(s) 1014 allow for input and output of data and/or information with other entities that may be connected to computing device 1000. For example, I/O interface(s) 1014 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 1020 can include instructions that, when executed, cause processor(s) 1002 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 1020) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 1004 and/or storage 1006 can store data, software, code, instructions (e.g., processor instructions), logic, parameters, combinations thereof, and/or the like used for operations described herein. This includes memory element(s) 1004 and/or storage 1006 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

In one form, a method is provided comprising: obtaining a universal reference for an executing application, wherein the universal reference identifies one or more components of the executing application by additional universal references assigned to the one or more components, determining a description of the executing application by enumerating each additional universal reference of the one or more components and additional sub-components, wherein the description exhaustively identifies components and sub-components of the executing application, and assessing the identified one or more components and sub-components to perform an admission control operation between the executing application and a second application.

In another form, the identified one or more components and sub-components are assessed against a list of approved or denied components and sub-components.

In another form, a monitoring application obtains the universal reference, determines the description of the executing application, and assesses the identified one or more components and sub-components to perform the admission control operation.

In another form, the executing application is executed in a secure enclave of a processor.

In another form, the executing application and the second application are executing in a same computing system.

In another form, the executing application and the second application are executing in separate remote computing systems that are in communication via a communication network.

In another form, assessing the identified one or more components and sub-components to perform the admission control operation includes determining that a mandatory component is included or excluded among the one or more components and sub-components.

In one form, a computer system is provided, comprising: one or more computer processors; one or more computer readable storage media; and program instructions stored on the one or more computer readable storage media for execution by at least one of the one or more computer processors, the program instructions comprising instructions to: obtain a universal reference for an executing application, wherein the universal reference identifies one or more components of the executing application by additional universal references assigned to the one or more components, determine a description of the executing application by enumerating each additional universal reference of the one or more components and additional sub-components, wherein the description exhaustively identifies components and sub-components of the executing application, and assess the identified one or more components and sub-components to perform an admission control operation between the executing application and a second application.

In one form, one or more computer readable storage media is provided, the one or more computer readable storage media collectively having program instructions embodied therewith, the program instructions executable by a computer to cause the computer to: obtain a universal reference for an executing application, wherein the universal reference identifies one or more components of the executing application by additional universal references assigned to the one or more components, determine a description of the executing application by enumerating each additional universal reference of the one or more components and additional sub-components, wherein the description exhaustively identifies components and sub-components of the executing application, and assess the identified one or more components and sub-components to perform an admission control operation between the executing application and a second application.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   generating, via a computing system, a hierarchy for an executing application representing components of the executing application with each child in the hierarchy representing a sub-component of a component of a corresponding parent and each parent identifies corresponding children, wherein a universal reference for each component comprises a hash and the universal reference of each parent component identifies that parent component and sub-components of that parent component, and wherein a root node of the hierarchy corresponds to the universal reference for the executing application;
   receiving, via the computing system, a request to perform admission control for the executing application to interact with a second application of a secure environment requiring attestation, wherein the request includes the universal reference of the executing application;

determining, via the computing system, a description of the executing application by traversing the hierarchy from component to component and enumerating each additional universal reference associated with children components;

assessing, via the computing system, the executing application against an admission control policy for admission control to the second application by comparing universal references of the description to a list of approved or denied components and sub-components to identify vulnerable components of the executing application;

assessing, via the computing system, whether the second application permits the vulnerable components or disallows the vulnerable components; and performing, via the computing system, an admission control operation controlling interaction between the executing application and the second application based on assessment of the admission control policy.

2. The computer-implemented method of claim 1, wherein denied components and sub-components of the list of approved or denied components and sub-components indicate the vulnerable components.

3. The computer-implemented method of claim 1, wherein a monitoring application determines the description of the executing application, and assesses the executing application to perform the admission control operation.

4. The computer-implemented method of claim 1, wherein the executing application is executed in a secure enclave of a processor.

5. The computer-implemented method of claim 1, wherein the executing application and the second application are executing in a same computing system.

6. The computer-implemented method of claim 1, wherein the executing application and the second application are executing in separate remote computing systems that are in communication via a communication network.

7. The computer-implemented method of claim 1, wherein assessing the executing application to perform the admission control operation includes determining that a mandatory component is included or excluded.

8. An apparatus comprising:
one or more computer processors;
a network interface configured to enable network communications;
one or more computer readable storage media; and
program instructions stored on the one or more computer readable storage media for execution by at least one of the one or more computer processors, the program instructions comprising instructions to perform operations including:
generating a hierarchy for an executing application representing components of the executing application with each child in the hierarchy representing a sub-component of a component of a corresponding parent and each parent identifies corresponding children, wherein a universal reference for each component comprises a hash and the universal reference of each parent component identifies that parent component and sub-components of that parent component, and wherein a root node of the hierarchy corresponds to the universal reference for the executing application;

receiving a request to perform admission control for the executing application to interact with a second application of a secure environment requiring attestation, wherein the request includes the universal reference of the executing application;

determining a description of the executing application by traversing the hierarchy from component to component and enumerating each additional universal reference associated with children components;

assessing the executing application against an admission control policy for admission control to the second application by comparing universal references of the description to a list of approved or denied components and sub-components to identify vulnerable components of the executing application;

assessing whether the second application permits the vulnerable components or disallows the vulnerable components; and performing an admission control operation controlling interaction between the executing application and the second application based on assessment of the admission control policy.

9. The apparatus of claim 8, wherein denied components and sub-components of the list of approved or denied components and sub-components indicate the vulnerable components.

10. The apparatus of claim 8, wherein a monitoring application determines the description of the executing application, and assesses the executing application to perform the admission control operation.

11. The apparatus of claim 8, wherein the executing application is executed in a secure enclave of a processor.

12. The apparatus of claim 8, wherein the executing application and the second application are executing in a same computing system.

13. The apparatus of claim 8, wherein the executing application and the second application are executing in separate remote computing systems that are in communication via a communication network.

14. The apparatus of claim 8, wherein assessing the executing application to perform the admission control operation includes determining that a mandatory component is included or excluded.

15. One or more non-transitory computer readable storage media collectively having program instructions embodied therewith, the program instructions being executable by a computer to cause the computer to perform operations comprising:
generating a hierarchy for an executing application representing components of the executing application with each child in the hierarchy representing a sub-component of a component of a corresponding parent and each parent identifies corresponding children, wherein a universal reference for each component comprises a hash and the universal reference of each parent component identifies that parent component and sub-components of that parent component, and wherein a root node of the hierarchy corresponds to the universal reference for the executing application;

receiving a request to perform admission control for the executing application to interact with a second application of a secure environment requiring attestation, wherein the request includes the universal reference of the executing application;

determining a description of the executing application by traversing the hierarchy from component to component and enumerating each additional universal reference associated with children components;

assessing the executing application against an admission control policy for admission control to the second application by comparing universal references of the description to a list of approved or denied components and sub-components to identify vulnerable components of the executing application;

assessing whether the second application permits the vulnerable components or disallows the vulnerable components; and performing an admission control operation controlling interaction between the executing application and the second application based on assessment of the admission control policy.

16. The one or more non-transitory computer readable storage media of claim 15, wherein denied components and sub-components of the list of approved or denied components and sub-components indicate the vulnerable components.

17. The one or more non-transitory computer readable storage media of claim 15, wherein a monitoring application determines the description of the executing application, and assesses the executing application to perform the admission control operation.

18. The one or more non-transitory computer readable storage media of claim 15, wherein the executing application is executed in a secure enclave of a processor.

19. The one or more non-transitory computer readable storage media of claim 15, wherein the executing application and the second application are executing in a same computing system.

20. The one or more non-transitory computer readable storage media of claim 15, wherein the executing application and the second application are executing in separate remote computing systems that are in communication via a communication network.

* * * * *